US012191130B2

(12) United States Patent
Richardson et al.

(10) Patent No.: US 12,191,130 B2
(45) Date of Patent: Jan. 7, 2025

(54) CHARGE DETECTION MASS SPECTROMETRY

(71) Applicant: Micromass UK Limited, Wilmslow (GB)

(72) Inventors: Keith Richardson, High Peak (GB); Jeffery Mark Brown, Hyde (GB); David J. Langridge, Bollington (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 18/495,237

(22) Filed: Oct. 26, 2023

(65) Prior Publication Data

US 2024/0063008 A1 Feb. 22, 2024

Related U.S. Application Data

(63) Continuation of application No. 17/745,513, filed on May 16, 2022, now Pat. No. 11,837,452, which is a continuation of application No. 16/971,958, filed as application No. PCT/GB2019/050494 on Feb. 22, 2019, now Pat. No. 11,367,602.

(30) Foreign Application Priority Data

Feb. 22, 2018 (GB) ..................................... 1802917

(51) Int. Cl.
*H01J 49/00* (2006.01)
*H01J 49/06* (2006.01)
*H01J 49/42* (2006.01)

(52) U.S. Cl.
CPC ........ *H01J 49/0036* (2013.01); *H01J 49/067* (2013.01); *H01J 49/4265* (2013.01)

(58) Field of Classification Search
CPC ... H01J 49/0036; H01J 49/067; H01J 49/4265
USPC ................................ 250/251, 282, 283, 281
See application file for complete search history.

(56) References Cited

U.S. PATENT DOCUMENTS 11,367,602 B2 * 6/2022 Richardson ......... H01J 49/0036
11,837,452 B2 * 12/2023 Richardson ......... H01J 49/0036

* cited by examiner

*Primary Examiner* — Nicole M Ippolito
(74) *Attorney, Agent, or Firm* — Goodwin Procter LLP

(57) ABSTRACT

Disclosed herein are various methods and apparatus for performing charge detection mass spectrometry (CDMS). In particular, techniques are disclosed for monitoring a detector signal from a CDMS device to determine how many ions are present in the ion trap (10) of the CDMS device. For example, if no ions are present the measurement can then be terminated early. Similarly, if more than one ion is present, the measurement can be terminated early, or ions can be removed from the trap (10) until only a single ion remains. Techniques are also provided for increasing the probability of there being a single ion in the trap (10). A technique for attenuating an ion beam is also provided.

20 Claims, 8 Drawing Sheets

CHARGE DETECTION MASS SPECTROMETRY

CROSS-REFERENCE TO RELATED APPLICATIONS

This application is a continuation of U.S. patent application Ser. No. 17/745,513, filed May 16, 2022, which is a continuation of U.S. patent application Ser. No. 16/971,958, filed Aug. 21, 2020, now U.S. Pat. No. 11,367,602, which is a U.S. national phase filing claiming the benefit of and priority to International Patent Application No. PCT/GB2019/050494, filed on Feb. 22, 2019, which claims priority from and the benefit of United Kingdom patent application No. 1802917.3, filed on Feb. 22, 2018. The entire contents of these applications are incorporated herein by reference.

FIELD OF THE INVENTION

The present invention relates generally to methods of mass spectrometry, and particularly to methods and devices for performing charge detection mass spectrometry. Also provided is a method and device for attenuating an ion beam.

BACKGROUND

Charge detection mass spectrometry (CDMS) is a technique wherein the mass of an individual ion is determined by simultaneously measuring both the mass-to-charge ratio (m/z) and the charge of that ion. This approach may thus avoid the need to resolve multiple charge states associated with traditional mass spectrometry methods, especially where electrospray ionisation is used. An example of the CDMS technique is described in Keifer et al. "Charge Detection Mass Spectrometry with Almost Perfect Charge Accuracy", Anal. Chem. 2015, 87, 10330-10337 (DOI: 10.1021/acs.analchem.5b02324).

SUMMARY

From a first aspect there is provided a method of charge detection mass spectrometry comprising: monitoring a detector signal from a charge detector of a charge detection mass spectrometry device during a first ion trapping event within an ion trap of the charge detection mass spectrometry device to determine how many ions are present within the ion trap during the first ion trapping event.

The method may further comprise: when it is determined that no ions are present within the ion trap during the first ion trapping event, terminating the first ion trapping event and/or initiating a second ion trapping event.

The method may additionally, or alternatively, comprise: when it is determined that more than one ion is present within the ion trap during the first ion trapping event, terminating the first ion trapping event and/or initiating a second ion trapping event.

In embodiments, when it is determined that more than one ion is present within the ion trap during the first ion trapping event, the method may comprise ejecting or otherwise removing one or more of the ions from the ion trap. For example, the method may comprise ejecting or otherwise removing all of the ions from the ion trap and initiating a second ion trapping event. However, it is also contemplated that the method may comprise ejecting or otherwise removing less than all of the ions from the ion trap. For instance, the method may comprise ejecting or otherwise removing one or more of the ions from the ion trap so that (or until) only a single ion remains within the ion trap.

The number of ions that are present within the ion trap of the charge detection mass spectrometry device may, for example, be determined based on the number of masses recorded in a spectrum by the charge detection mass spectrometry device and/or based on the total charge detected by the charge detection mass spectrometry device. In embodiments, the number of ions that are present within the ion trap is determined by analysing a transient detector signal from the charge detector. For example, in embodiments, the determination may be made within less than about is of initiating an ion trapping event, such as within about 0.5 s. In embodiments, the determination may be made within 0.2 s, or within 0.1 s.

The methods of the first aspect, in any of its embodiments, are generally performed using a charge detection mass spectrometry device. The charge detection mass spectrometry device may generally comprise an ion trap for holding one or more ions to be analysed and (at least) a charge detector within the ion trap for determining a charge for the one or more ions to be analysed. The charge detector may comprise one or more charge detecting electrode(s). The charge detection mass spectrometry device may also comprise control circuitry for processing the signals obtained, for example, from the charge detector. The charge detection mass spectrometry device may generally comprise part of a mass spectrometer. So, various ion guiding or manipulating components of the mass spectrometer may be provided upstream and/or downstream of the charge detection mass spectrometry device.

Accordingly, from a second aspect, there is provided a charge detection mass spectrometry device comprising: an ion trap for holding one or more ions to be analysed; one or more charge detector(s) within the ion trap for determining a charge for the one or more ions to be analysed; and control circuitry for monitoring a detector signal from the charge detector(s) during a first ion trapping event to determine how many ions are present within the ion trap during the first ion trapping event.

The present invention in the second aspect may include any or all of the features described in relation to the first aspect of the invention, and vice versa, to the extent that they are not mutually inconsistent. Thus, even if not explicitly stated herein, the device may comprise suitable means or circuitry for carrying out any of the steps of the method or invention as described herein.

In particular, when it is determined that no ions are present within the ion trap during the first ion trapping event the control circuitry may be configured to terminate the first ion trapping event and/or initiate a second ion trapping event.

Additionally, or alternatively, when it is determined that more than one ion is present within the ion trap during the first ion trapping event the control circuitry may be configured to terminate the first ion trapping event and/or initiate a second ion trapping event.

In embodiments, when it is determined that more than one ion is present within the ion trap during the first ion trapping event, the control circuitry may be configured to eject or otherwise remove one or more of the ions from the ion trap. For example, the control circuitry may cause all of the ions to be ejected or otherwise removed from the ion trap and to then initiate a second ion trapping event. However, it is also contemplated that less than all of the ions may be ejected (removed) from the ion trap. For instance, the control circuitry may be configured to eject or otherwise remove one or more of the ions from the ion trap so that only a single ion remains within the ion trap.

The number of ions that are present within the ion trap of the charge detection mass spectrometry device may be determined using suitable signal processing circuitry. The signal processing circuitry may, for example, be configured to analyse the (transient) signals in substantially real-time to determine how many ions are present within the ion trap during the first ion trapping event.

In embodiments, the geometry of the ion trap may be configured such that ion trajectories become unstable when more than one ion is present resulting in the ejection of all but one ion. In this way, when more than one is present within the ion trap during the first ion trapping period, the ion trap may be configured to naturally eject one or more ions.

In embodiments, a plurality of charge detection mass spectrometry devices are provided. Each charge detection mass spectrometry device may comprise an ion trap and one or more charge detector(s), and may each therefore be capable of performing an independent measurement. The plurality of charge detection mass spectrometry devices can then be used to perform simultaneous or parallel measurements.

For instance, in some embodiments, a plurality of such charge detection mass spectrometry devices may be arranged within an ion guide. Considered alternatively, a charge detection mass spectrometry device may be provided that comprises a plurality of ions traps, or ion trapping regions, each having an associated one or more charge detector(s), positioned within an ion guide.

In this case, the charge detection mass spectrometry device may be arranged to increase the likelihood of their being (only) a single ion within the ion traps (or trapping regions). For example, each of the ion traps may be configured such that ion trajectories become unstable when more than one ion is present resulting in the ejection of all but one ion. At the same time, the ion guide may provide overall (radial) confinement of the ions. Accordingly, when a plurality of ions are injected into the ion guide, the ions may naturally distribute themselves between the plurality of ion traps (trapping regions) due to space charge effects, and in embodiments so that no more than one ion is present in any of the ion traps (trapping regions).

The method of the first aspect described above may be implemented within such an apparatus. In that case, the method may comprise monitoring the detector signal from each (or any) of the charge detection mass spectrometry devices to determine how many ions are present within each (or an) ion trap. However, it is believed that this apparatus is novel and inventive in its own right.

Thus, from a further aspect, there is provided a charge detection mass spectrometry device comprising: an ion guide for confining a plurality of ions, wherein the ion guide comprises a plurality of ion traps, and wherein the geometry of each ion trap is configured such that ion trajectories become unstable when more than one ion is present resulting in the ejection of all but one ion from that ion trap, so that when a plurality of ions are passed to the charge detection mass spectrometry device, the plurality of ions distribute themselves between the plurality of ion traps so that no more than one ion is present in any of the ion traps. The ion guide may comprise any suitable ion guide. For instance, in embodiments, the ion guide may comprise a stacked ring ion guide but other arrangements would of course be possible. From a related aspect, there is provided a method of charge detection mass spectrometry comprising: passing a plurality of ions to be analysed to a charge detection mass spectrometry device according to this further aspect.

In some embodiments, a plurality of independent charge detection mass spectrometry devices may be used, each comprising an ion trap and one or more charge detector(s). An upstream ion optical device such as a lens or a beam splitter device may then be provided for selectively or sequentially passing a plurality of ions to be analysed to respective ion traps of the charge detection mass spectrometry devices. This arrangement may therefore allow for performing multiplexed (interleaved) measurements, thereby enhancing duty cycle. This may be used in combination with the method of the first aspect, or the apparatus of the further aspect described above. That is, the detector signal from each of the plurality of charge detection mass spectrometry devices may be monitored to determine how many ions are present within each device. However, it is also believed that this apparatus is novel and inventive in its own right.

Thus, from a yet further aspect, there is provided a charge detection mass spectrometry apparatus comprising: a plurality of charge detection mass spectrometry devices; and an ion optical device for selectively or sequentially passing a respective plurality of ions to be analysed to the plurality of charge detection mass spectrometry devices. Each charge detection mass spectrometry device comprises an ion trap and one or more charge detector(s) for detecting ions within the ion trap such that each ion trap is capable of performing an independent measurement. The ion optical device may be provided separately from and upstream of the charge detection mass spectrometry devices. However, it is also contemplated that the ion optical device may be integrated as part of a single charge detection mass spectrometry device comprising a plurality of ion traps and an ion optical device for selectively or sequentially passing a respective plurality of ions to be analysed to the plurality of ion traps From a related aspect there is provided a method of charge detection mass spectrometry comprising: selectively or sequentially passing a plurality of ions to a respective plurality of ion traps so that a single ion is passed to each of the ion traps; and analysing the ions within the respective ion traps.

In embodiments, a plurality of charge detection mass spectrometry devices can be configured in a micro-fabricated array. In this way several hundred devices can be provided working in parallel allowing spectra to be generated at a much higher rate. Depending on the mechanism used to fill the traps each trap may then contain zero, one, or more than one ion. In that case, data from traps containing zero or multiple ions can be discarded. Thus, in embodiments, a plurality of charge detection mass spectrometry devices are provided in parallel, and the measurements from any devices giving no signal (no ions) or a poor signal (multiple ions) can then be discarded during the signal processing.

In embodiments, the charge detection mass spectrometry device(s) are used for measuring single ions. For instance, in embodiments of the first aspect, as described above, when it is detected that this is not the case, the measurement may be terminated, or the device operation adjusted accordingly. Thus, embodiments relate to methods of single ion charge detection mass spectrometry. However, in other embodiments, multiple ions may be measured simultaneously using a single charge detection mass spectrometry device. That is, multiple ions may be simultaneously present within a single ion trap of a charge detection mass spectrometry device. In this case, in order to minimise interference between the ions, the ion trap geometry and electric fields may be arranged so that the ion trajectories diverge away from the charge detector such that when multiple ions are simultaneously present within the ion trap the ions diverge away from each other as they move away from the charge detector. That is, when the ions are not passing through or by the charge detector, their trajectories are such that the ions can be kept apart each other. For example, the ion trajectories may define a "dumbbell" or "H" shape such that all of the ions can pass through a central charge detector but then spread out as they move away from the charge detector. In this way, the effects of space charge interactions can be reduced. For instance, the charge detector can be positioned in the center of the trap with the ion trajectories set up such that the ions have maximum velocity as they pass through the charge detector. However, away from the charge detector, at the extremes of the trajectories where the ions are moving relatively slowly, and are therefore most susceptible to space charge effects, the trajectories can be designed to keep the ions far apart from each other.

Thus, from a yet still further aspect, there is provided a charge detection mass spectrometry device comprising: an ion trap for holding one or more ions to be analysed; and a charge detector within the ion trap for determining a charge for the one or more ions to be analysed, wherein the ion trap is configured so that the ion trajectories diverge away from the charge detector such that when multiple ions are simultaneously present within the ion trap the ions spread out from each other away from the charge detector to reduce the space charge interactions between the multiple ions.

The charge detection mass spectrometry device(s) according to any of the aspects or embodiments described above may generally contain one or more charge detector electrode(s). In some embodiments, only a single charge detector is provided which may comprise a single electrode for example in the form of a metal cylinder. However, other arrangements would of course be possible. For instance, in other embodiments, the charge detection mass spectrometry device may comprise a plurality of charge detectors (each comprising one or more electrode(s)).

From a yet still further aspect there is provided a charge detection mass spectrometry device comprising: an ion trap for holding one or more ions to be analysed; and a plurality of charge detectors within the ion trap for determining a charge for the one or more ions to be analysed. The ion trap may have a multi-pass geometry, or may have a cyclic or folded flight path geometry.

In embodiments, according to any of the aspects described herein, a substantially quadratic potential may be applied to the ion trap (or ion traps) of a charge detection mass spectrometry device such that ions undergo substantially harmonic motion within the ion trap.

Indeed, from another aspect, there is provided a charge detection mass spectrometry device comprising: an ion trap for holding one or more ions to be analysed; and one or more charge detector(s) within the ion trap for determining a charge for the one or more ions to be analysed, wherein a substantially quadratic potential is applied to the ion trap such that ions undergo substantially harmonic motion within the ion trap.

In embodiments, the signals obtained from the charge detection mass spectrometry device may be processed using forward fitting and/or Bayesian signal processing techniques. Indeed, from another aspect, there is provided a method of charge detection mass spectrometry comprising: obtaining one or more signals from a charge detector of a charge detection mass spectrometry device; and processing the one or more signals using forward fitting and/or Bayesian signal processing techniques to extract a charge value for one or more ions within the charge detection mass spectrometry device.

An ion beam may be attenuated prior to being passed to the charge detection mass spectrometry device according to any of the aspects or embodiments described above. In this way, the ion flux that is passed into the charge detection mass spectrometry device may be controlled (reduced) to reduce the likelihood of more than one ion being present in a given trap during a single ion trapping event. Any suitable ion beam attenuation device may be used. However, in embodiments, the ion beam attenuating device comprises a plurality of ion beam attenuators that are each operable to either transmit substantially 100% of the ions (a high transmission (or low attenuation) state) or to transmit substantially 0% of the ions (a low transmission (or high attenuation) state).

Each ion beam attenuator may be arranged to alternately switch between high and low ion transmission states such that a continuous ion beam passing through the ion beam attenuator is effectively chopped to generate a non-continuous attenuated ion beam. The resulting attenuated ion beam can then be homogenized and converted back to a substantially continuous ion beam by passing the attenuated ion beam through a gas-filled region such as an ion guide or generally a gas cell wherein interactions between the ions and the gas molecules cause the ions to effectively spread out in a dispersive fashion.

To improve the attenuation, a plurality of ion beam attenuators may be provided in series, with the attenuated ion beam output from each ion beam attenuator being passed through a respective gas-filled region (or regions) in order to generate a substantially continuous ion beam for input to the next ion beam attenuator in the series (and so on, where more than two ion beam attenuators are provided) in order to generate a multiple attenuated output.

The plurality of ion beam attenuators may be arranged contiguously, one after another, in an alternating sequence of one or more ion beam attenuators and one or more gas-filled regions (gas cells). However, other arrangements would of course be possible.

In this way, an incoming ion beam can thus be readily attenuated as it passes through the series of ion beam attenuators to reliably give a very low flux. It will be appreciated that this ion beam attenuating device may also find utility for other applications and is not limited to use in combination with charge detection mass spectrometry detection devices. For instance, there are various applications where it may be desired to reliably reduce the ion flux. In general, the ion beam attenuation device may be used in any experiment where it is desired to controllably reduce the ion flux. For example, the ion beam attenuating device may be provided upstream of any suitable ion trap to avoid overfilling the trap. A specific example of this might be an ion trap providing ions to an ion mobility separation device. As another example, the ion beam attenuating device may be provided as part of (or upstream of) a detector system to avoid detector saturation. A further example would be controlling the flux of ions into a reaction cell in order to optimise the efficiency of ion-molecule or ion-ion reactions. However, various other arrangements would of course be possible.

Thus, from a yet further aspect there is provided an ion beam attenuating apparatus comprising: a first ion beam attenuator that is operable in either a high ion transmission mode or a low ion transmission mode in order to selectively attenuate an ion beam, wherein the output of the first ion beam attenuator is passed through a first gas-filled region; a second ion beam attenuator that is operable in either a high ion transmission mode or a low ion transmission mode in order to selectively attenuate an ion beam; and control circuitry that is configured to: repeatedly switch the first ion beam attenuator between the high and low ion transmission modes to generate a first non-continuous ion beam at the output of the first ion beam attenuator, wherein the first non-continuous ion beam is passed through the gas-filled region and converted into a substantially continuous ion beam thereby before arriving at the second ion beam attenuator; and repeatedly switch the second ion beam attenuator between the high and low ion transmission modes to generate a second non-continuous ion beam at the output of the second ion beam attenuator.

From a related aspect there is provided method of attenuating an ion beam, comprising: passing the ion beam to a first ion beam attenuator and repeatedly switching the first ion beam attenuator between high and low ion transmission modes to generate a first non-continuous ion beam at the output of the first ion beam attenuator; passing the first non-continuous ion beam through a gas-filled region to convert the first attenuated ion beam into a substantially continuous attenuated ion beam; passing the substantially continuous ion beam to a second ion beam attenuator and repeatedly switching the second ion beam attenuator between high and low ion transmission modes to generate a second non-continuous ion beam at the output of the second ion beam attenuator.

In embodiments, the second non-continuous ion beam is passed through a second gas-filled region and converted into a substantially continuous attenuated ion beam. That is, the method may comprise passing the second attenuated ion beam through a second gas-filled region to generate a substantially continuous attenuated ion beam.

The first and/or second ion beam attenuator may comprise one or more electrostatic lenses. The one or more electrostatic lenses may comprise one or more electrodes wherein the state of the ion beam attenuator can be alternated by changing one or more voltages applied to the electrodes. However, other arrangements are of course possible. For instance, the ion beam attenuator(s) may comprise a mechanical shutter or mechanical ion beam attenuator. Alternatively, the ion beam attenuator(s) may comprise a magnetic ion gate or magnetic ion beam attenuator.

The output from each ion beam attenuator may be passed through a gas-filled region. Typically, the gas-filled region comprises an ion guide or gas cell. A differential pumping aperture may therefore be provided at the entrance and/or exit of the gas-filled region.

The gas pressure within the gas-filled region may be selected, along with the length of the gas-filled region, to allow the attenuated ion beams to be substantially fully converted into a continuous ion beam between each ion beam attenuator.

The first and second ion beam attenuators may have the same attenuation factor (and may be alternated at the same frequency). Alternatively, the first and second ion beam attenuators may provide different attenuation factors.

When more than one ion beam attenuator is utilized in this fashion there may be more than one way to achieve a desired level of attenuation. For example, if attenuation to 1% intensity is required using two lenses, the first attenuator may be set to 1% and the second to 100% or vice versa. Alternatively, both devices may be operated at intermediate values to give a combined transmission of 1%. For example, the first and second ion beam attenuators may both be operated at 10%, or one of the ion beam attenuators operated at 20% with the other of the ion beam attenuators operated at 5%, and so on. Since the attenuation devices may become contaminated during long term use, it may be desirable to balance the attenuation evenly between the first and second ion beam attenuators, or to periodically change the attenuator that is used most for attenuation to prolong the period between maintenance, cleaning and/or replacement. Thus, in embodiments, when it is desired to provide a target overall attenuation, the method may comprise adjusting the relative attenuation provided by the first and second ion beam attenuators in such a manner to maintain the targeted overall attenuation.

From a further aspect, there is provided a method of single ion charge detection mass spectrometry in which the signal is analysed in real time and used for early termination of trapping events which will not produce useful data. For example, trapping events containing no ions or where more than a maximum number of ions are present may be terminated early.

It will be appreciated that the present invention in any of these further aspects may include any or all of the features described in relation to the first and second aspects of the invention, and vice versa, at least to the extent that they are not mutually inconsistent. It will also be appreciated by those skilled in the art that all of the described embodiments of the invention described herein may include, as appropriate, any one or more or all of the features described herein.

BRIEF DESCRIPTION OF THE DRAWINGS

Various embodiments will now be described, by way of example only, and with reference to the accompanying drawings in which.

DETAILED DESCRIPTION

Various embodiments are directed towards methods of charge detection mass spectrometry (CDMS). It will be understood that CDMS generally involves a simultaneous measurement of both the mass-to-charge ratio (m/z) and the charge (z) of an ion. In this way, the mass (m) of the ion can then be determined (indirectly). The charge of an ion may typically be measured directly using a charge detection electrode. For example, when an ion is caused to pass through (or by) a charge detection electrode, the ion will induce a charge on the charge detection electrode which can then be detected, for example, by suitable detection (signal processing) circuitry connected to the charge detection electrode. The mass-to-charge ratio of the ion can generally be determined in various suitable ways. For example, the mass-to-charge ratio may be determined from the time-of-flight of the ion within the CDMS device or the ion velocity (so long as the energy per charge is known). Thus, various examples of CDMS experiments are known and it will be appreciated the embodiments described herein may generally applied to any suitable CDMS experiment, as desired.

However, typically, the mass-to-charge ratio may be determined from the frequency of oscillation of the ion, for example, within a trapping field. Thus, the CDMS device may generally comprise an ion trap within which ions to be analysed are contained. Ions are thus analysed in discrete 'ion trapping events'. Thus, in each ion trapping event, the ion trap is opened to allow ions to enter the ion trap for analysis. At the end of an ion trapping event those ions may then be ejected and a new ion trapping event initiated.

For example, in some CDMS experiments such as that described in Keifer et al. "Charge Detection Mass Spectrometry with Almost Perfect Charge Accuracy", Anal. Chem. 2015, 87, 10330-10337 (DOI: 10.1021/acs.analchem.5b02324), single ions are analysed in an ion trap for periods of up to about three seconds. In the CDMS experiment described by Keifer et al. ions are caused to pass repeatedly through a metal cylinder at the centre of the ion trap which is connected to an amplifier and digitiser. When ions are at the centre of the cylinder, the magnitude of the charge induced on the cylinder is equal to the charge on the ion.

Figure 1:
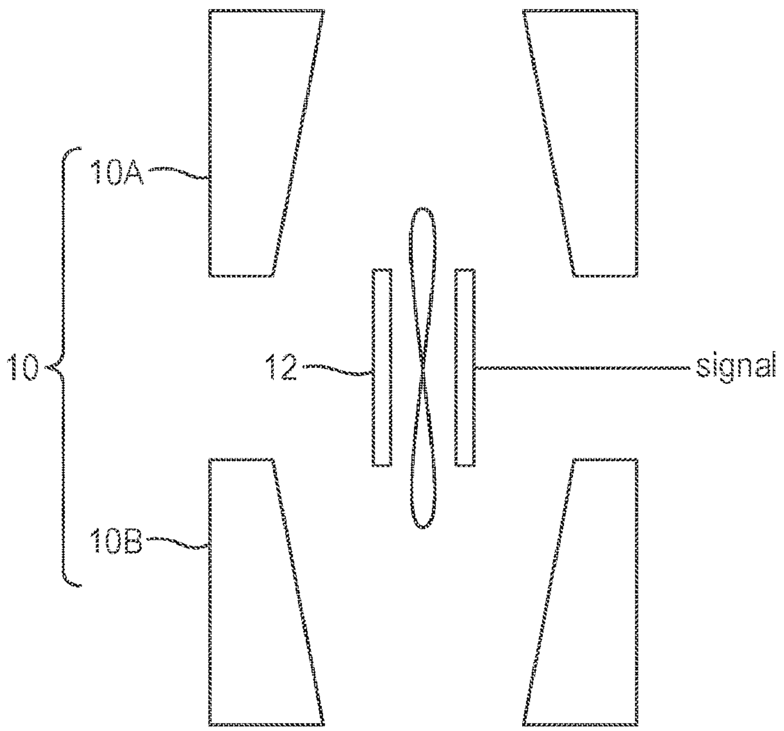
FIG. 1 shows schematically a single charge detection mass spectrometry (CDMS) device that may be used in embodiments.

FIG. 1 shows schematically a single CDMS device according to an embodiment. As shown in FIG. 1, the device comprises an electrostatic ion trap in the form of a cone trap 10 formed by a pair of spaced-apart conical electrodes 10A, 10B to which suitable electric fields can be applied in order to confine ions within the cone trap 10. A charge detector 12 is provided within the cone trap 10 comprising a metal cylinder that acts as a charge detecting electrode. The movement of one or more ion(s) through the electrodes of the charge detector 12 generates a signal indicative of the charge of the ion(s). Ions can thus be injected into the cone trap 10, and confined thereby (an ion trapping event), and caused to move between the electrodes of the charge detector 12 in order to perform a CDMS measurement. Once the CDMS measurement has been performed, any ions currently within the cone trap 10 can be ejected and a new ion trapping event initiated (by injecting a new set of ions).

However, other arrangements would of course be possible. Thus, whilst FIG. 1 shows a cone trap 10, it will be appreciated that any other suitable ion trap may be used. Similarly, any suitable arrangement of charge detecting electrode(s) may be used in combination with such ion traps.

In a well-calibrated system, the amplitude of the recorded signal can therefore be used to measure the charge on the ion. However, because the signal to noise ratio is low, many ion passes may typically be required to make an accurate charge measurement. Current state of the art instruments are capable of producing better than unit-charge resolution, for example, so that the charge on almost all of the trapped ions can be determined exactly. The frequency of oscillation of the ion in the trap is related to its mass to charge ratio. Although the signal is typically significantly non-sinusoidal, a Fourier transform of the recorded transient allows a measurement of the mass-to-charge ratio (albeit at low resolution). Taken together, the measurements of the mass-to-charge ratio and charge allow the mass of the ion to be determined.

It will be appreciated that this approach may be particularly useful for producing mass spectra of high molecular weight species (such as in the range of mega Dalton and above) as traditional (for example) electrospray mass spectra can be hard to interpret in this regime as different charge states are often poorly resolved from each other. However, CDMS techniques can be relatively slow. For instance, thousands of ion trapping events may typically be required to build up a useful mass spectrum. Methods of shortening the time required to produce a spectrum are therefore of particular interest.

Various examples of the present disclosure will now be described.

Single Ion Selection

In some embodiments, it may be desired to select a single ion ($N=1$) for analysis for efficient operation of the CDMS device. According to the techniques described in Kiefer et al., the mean of the ion arrival Poisson distribution is set to one ion (in a fill period of ~0.5 ms). However this means that in a majority of cases (~63%) the fill will result either in no ions ($N=0$) or more than one ion ($N>1$). When $N=0$, the (long) acquisition time (up to ~ three seconds) is wasted. Furthermore, when more than one ($N>1$) ion is held in the ion trap, the signal may be badly contaminated due to space charge effects.

Thus, in embodiments, the detector signal may be monitored in real time, and if after a period of time (for example, 10 or 50 or 100 ms) signal processing suggests $N=0$ or $N>1$, the current acquisition may be terminated early and a new fill event started, resulting in increased throughput. For instance, the acquisition may be terminated by applying suitable electric fields to (rapidly) remove all of the ions from the CDMS device. For example, by removing the trapping fields and/or applying one or more ejection fields the ions can then be "ejected" (or otherwise removed) from the trap and lost to the system or to collisions with the electrodes.

Alternatively, in other embodiments, when it is determined that $N>1$, it may be possible to excite ions in the trap to eject $N-1$ ions (such that these ions are then lost, as above), leaving only a single ion for analysis. This may be done deterministically or further monitoring may be performed to check that only one ion remains. It will be appreciated that ejecting ions from the trap may be advantageous compared to starting a new fill event since in that case the success rate may be close to 100% (whereas a new fill would generally succeed in only 37% of cases—that is there is a ~63% chance that the new fill will result either in no ions or more than one ions).

Similarly, in this way, if an ion is lost during a trapping period (so that $N=0$), for example, due to scattering with the residual gas, or an unstable trajectory, the acquisition may be terminated early allowing a new fill event.

Thus, by contrast to more conventional approaches where a fixed ion trapping period is used for CDMS measurement (even if there are no ions being measured, or wherein multiple ions are present compromising the signal), in embodiments, an ion trapping event can be terminated early if the signal processing suggests $N=0$ or $N>1$. Alternatively, if the signal processing suggests $N>1$, the operation of the CDMS device can be adjusted until $N=1$. Thus, the CDMS device can be dynamically controlled based on a determination of how many ions are present in the device.

The detector signal may be monitored using any suitable techniques. For instance, in some embodiments, real time signal processing may consist of a series of overlapping apodised fast Fourier transforms. Estimation of the number of ions present in the trap may, for example, be based on the number of masses present in the spectrum above a noise threshold, or the total charge detected, or a combination of these.

Embodiments are also contemplated for tuning the ion arrival rate to maximise the probability of N=1. For instance, in some examples, one or more dynamic range enhancement (DRE) lenses may be used to control the flux of the ion beam in real time over a wide dynamic range. For example, a configuration involving multiple DRE lenses separated by gas filled cells at collision cell pressure for beam remerging may assist with control of the flux of the ion beam in real time over a wide dynamic range to help maximise the probability of N=1 ions arriving at the CDMS device.

In some embodiments, instead of exciting ions from the ion trap when it is determined that more than one ion is present, the ion trap itself may be designed such that the ion trajectories become unstable when more than one ion is present, resulting in ejection of all but one ion. In other words, the ion trap may be designed as a so-called "leaky" single ion trap. For instance, this may be achieved using an appropriately designed geometry and/or by applying one or more appropriate electric fields to the ion trap. In embodiments, the ion trap(s) may be of the type described in U.S. Pat. No. 8,835,836 (MICROMASS) wherein once the charge capacity of the ion trap has been reached the force on the ions due to coulombic repulsion is such that excess ions will leak or otherwise emerge from the trap.

Ion Trap—Space Charge Effects

Figure 2:
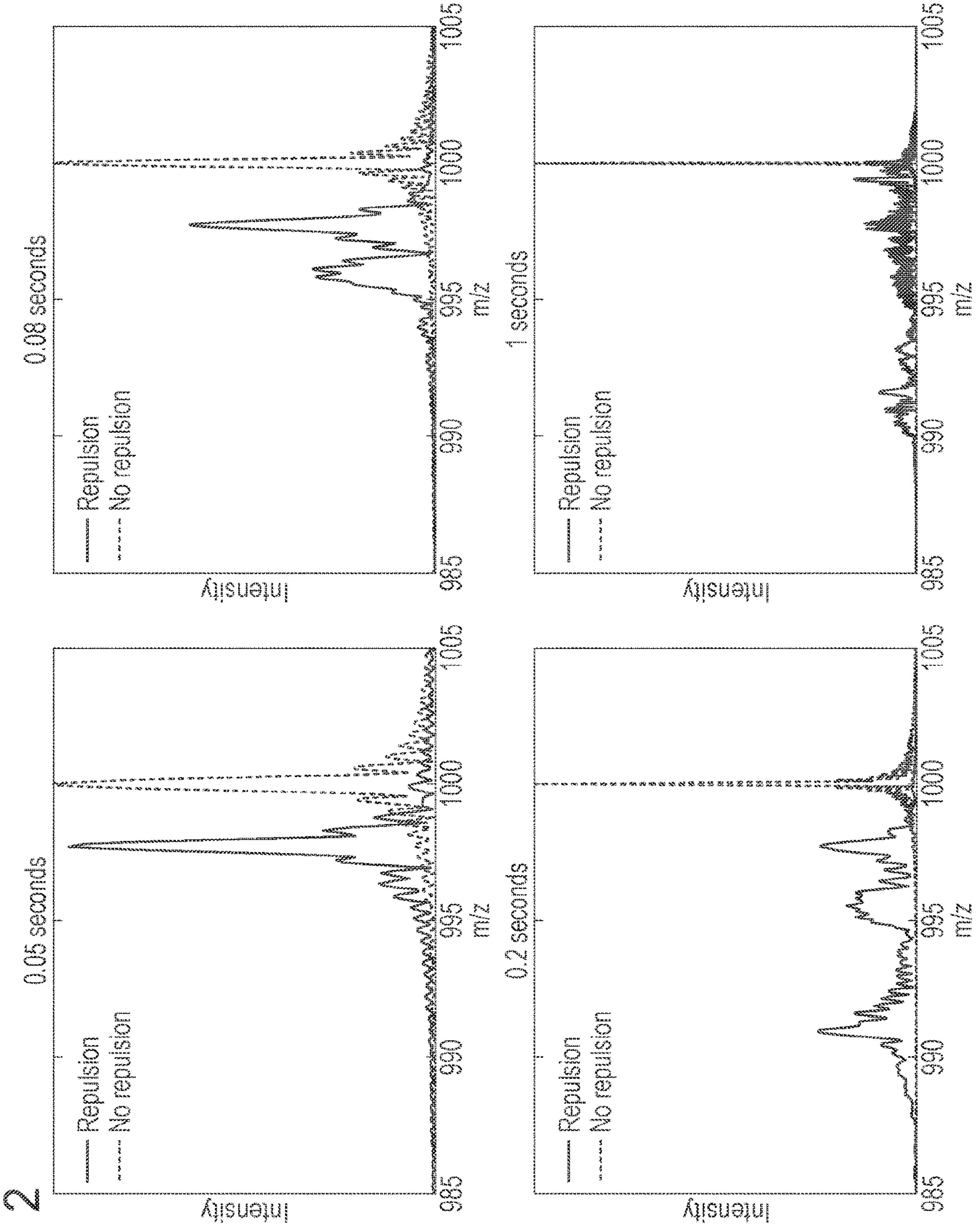
FIG. 2 illustrates how the detector signal may vary when more than one ion is present within an ion trap of a CDMS device like that shown in FIG. 1.

FIG. 2 shows a series spectra obtained by simulating the motion and detection of two identical ions with energies of 100 eV in a cone trap configured for CDMS after 0.05 s, 0.08 s, 0.2 s and is respectively. The transients were sampled at a rate of 1.25 MHz. Spectra were obtained from the raw transients using a Fast Fourier Transform (FFT). The ions have mass of 100 kDa and a charge of 100 so that their mass to charge ratio is 1000 Th.

In particular, FIG. 2 compares the ideal data that would be obtained if the ions did not interact with each other with the data obtained when realistic space charge effects are taken into account. The ideal data is essentially the same as would be obtained for a single ion, and shows a steady increase in resolution as the time is increased, as expected, with the peak centered on the correct mass to charge ratio. On the other hand, where the two ions are able to interact, it can be seen that even after 0.05 s there is already a deviation from the correct mass to charge ratio, and by 0.08 s the signal has split into two distinct peaks. By 0.2 s these two peaks have collapsed and by the end of the transient at Is, the data are completely compromised.

By providing and analysing these data while the transient is still in progress, then by 0.08 s or even earlier it is possible to determine whether more than one ion is present in the trap. This determination could be made using statistical or Bayesian model comparison (comparing the probability that one peak is present with the probability for two peaks or more than two peaks) or hypothesis testing or by simply counting peaks in a smoothed version of the spectrum, or by measuring the full width of the spectrum at a fraction of the maximum intensity compared with the expected width for a single peak, or by a wide variety of other possible methods.

In this case, since the full transient length is 1 s, terminating trapping after 0.2 s (allowing 120 ms for data processing) saves 0.8 s of wasted acquisition time.

FIG. 2 thus shows that it is possible to identify very quickly when the ion trap contains more than ion, to allow the transient to be terminated early, or for the ion trap to be controlled to eject one or more ion(s). Clearly, it can also be identified very quickly when no signal is present, in which case the transient may also be terminated early.

More generally, if the full transient time is $T_L$ and a transient is ended after time $T_S$ if it contains no ions or more than one ion then the rate with which good transients are obtained is:

$$R_{good} = \frac{\lambda}{(T_L - T_S)\lambda + e^{\lambda} T_S}$$

where $\lambda$ is the average number of ions that enter the trap during a trap filling period. $R_{good}$ is maximised when $\lambda=1$ regardless of the values of $T_L$ and $T_S$ so that the intensity of the ion beam supplying the trap should be optimised to obtain this rate as nearly as possible. For $\lambda=1$, $$R_{good} = \frac{1}{T_L + (e-1)T_S}$$

Figure 3:
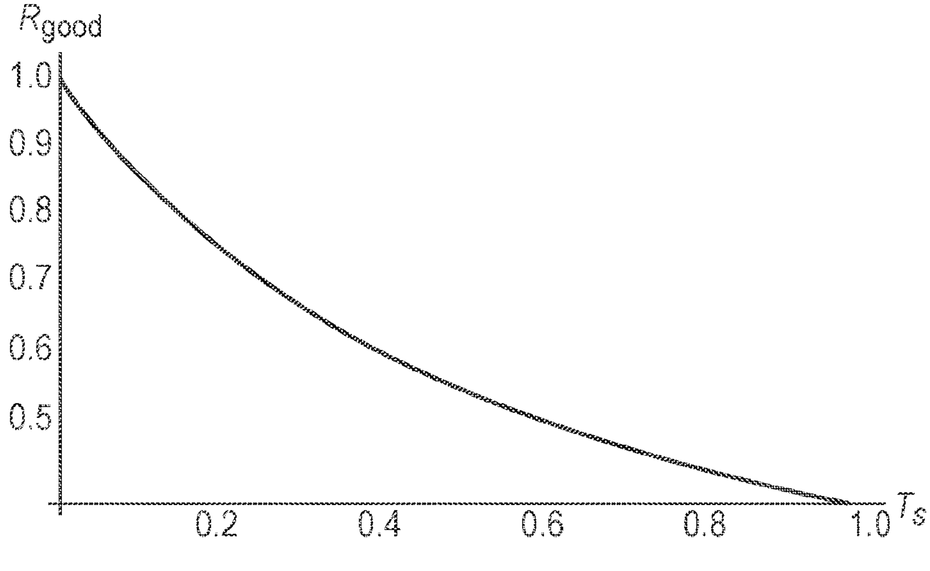
FIG. 3 shows how the rate with which good transients are obtained varies as a function of the time after which an unwanted transient can be terminated.

FIG. 3 shows how $R_{good}$ changes for a fixed value of $T_L=1$ and $T_S$ is varied. For $T_S=0.2$, good, single ion transients are obtained with a rate $R_{good}=0.74$ which is more than double the rate obtained when bad transients cannot be terminated early (i.e. $T_S=T_L=1$).

High Dynamic Range Ion Beam Attenuation

As mentioned above, embodiments are contemplated for controlling the flux of the ion beam in real time over a wide dynamic range to help maximise the probability of N=1 ions arriving at the CDMS device. However, it will be appreciated that there are many scenarios in which it is desirable to reduce the intensity of an ion beam in a controlled, quantitative, unbiased manner. That is, the degree of attenuation should not depend on m/z, ion mobility, propensity to fragment or charge reduce or any other ion characteristic within a relevant range for each property.

For example, this may be desirable to avoid unwanted problems arising from high ion flux including overfilling of traps including those used in ion mobility experiments (resulting in uncontrolled and biased loss of ions or unwanted fragmentation), space charge effects, detector saturation (resulting in loss of quantitative accuracy, mass accuracy and artificial peaks) and charging of surfaces inside an instrument resulting in further loss of ions or distortion of the onwardly transmitted ion beam in a range of applications including but not limited to producing controlled low ion fluxes to be used in experiments involving single ions or few ions such as CDMS.

When a beam has been attenuated in a quantitative and unbiased manner it is often possible to recover many of the properties of the ideal signal that would have been obtained from the original un-attenuated beam by simply rescaling or otherwise adjusting the data produced by the instrument in question (for example the intensity of a mass spectral peak produced by a mass spectrometer).

The degree of attenuation can be constant for the duration of an experiment or it may vary in a predetermined way, or in response to information obtained from data that has already been acquired during the experiment (in a data dependent way).

Beam attenuation can also result in loss of small signals which fall below a detection threshold following attenuation. For this reason, an instrument may alternate between two or more modes of operation utilizing different degrees of attenuation. A final combined data set may then be reconstructed from the two or more datasets by taking small signals from data that is less attenuated, and larger signals from data that is more attenuated.

U.S. Pat. No. 7,683,314 (MICROMASS) discloses methods of attenuation of an ion beam which operate by alternating between a mode in which transmission is substantially 100% (for time $\Delta T_2$) and a mode in which transmission is substantially 0% (for time $\Delta T_1$). For example, this may be achieved by alternating a retarding voltage to repeatedly switch the ion beam between the two states.

Figure 4:
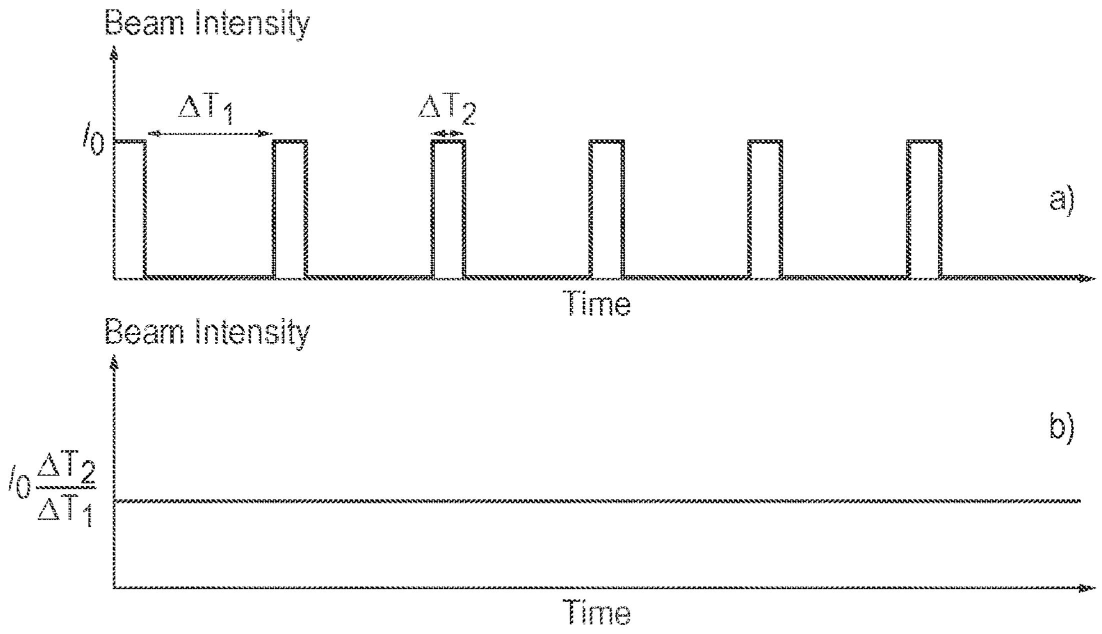
FIGS. 4A and 4B illustrate how an ion beam may be attenuated.

FIG. 4A shows the ideal beam intensity as a function of time following this attenuation step. Since the resulting beam is discontinuous, or chopped, it is possible to operate such a device upstream of an ion guide or gas collision cell in order to convert it into a substantially continuous beam that has been reduced to a fraction $\Delta T_2/\Delta T_1$ of its original intensity as shown in FIG. 4B.

However, since it inevitably takes a finite time for the ion beam to fully respond to changes in voltage intended to switch between the on and off states, when the duration of the on state $\Delta T_2$ becomes too short, there is insufficient time to recover 100% transmission before the next voltage change and attenuation is no longer linear or quantitative. On the other hand, when the time interval $\Delta T_1$ becomes comparable with the time to pass through the downstream gas cell or ion guide, it is no longer possible to restore the beam to a substantially continuous beam.

This means that there is a practical limit to the degree of quantitative attenuation that can be achieved by such a device (e.g. attenuation to 1% of the original intensity in a typical device).

According to an embodiment of the present disclosure, there is provided a method of attenuation using two attenuation devices of the type described above, separated by a gas cell or ion guide designed to convert the ion beam into a substantially continuous beam.

Figure 5:
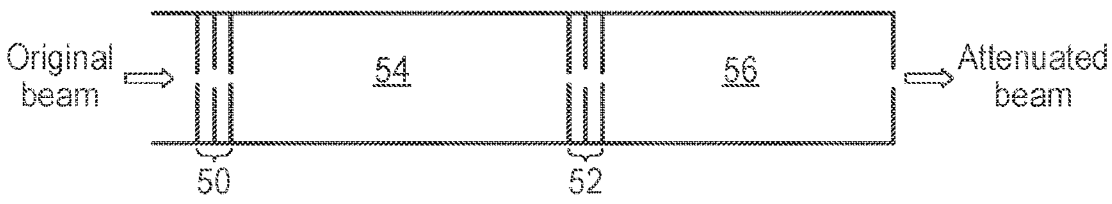
FIG. 5 shows schematically an ion beam attenuation device that may be used in embodiments.

FIG. 5 shows an example of an attenuation device according to an embodiment. As shown, the device includes a first attenuation device 50 comprising a plurality of electrodes defining an electrostatic lens and a second attenuation device 52 of the same type. The first and second attenuation devices 50,52 are separated by a first ion guide or gas collision cell 54. The incoming ion beam can thus be attenuated by the first attenuation device 50 (for example according to a scheme like that shown in FIG. 4A). As the chopped ion beam passes through the first ion guide or gas collision cell 54 the interactions of the ions with the gas molecules cause the ions to spread out and the beam is converted back into a substantially continuous beam (as shown in FIG. 4B). The beam is then passed to the second attenuation device 52 where it is attenuated again before being passed through a second ion guide or gas collision cell 56.

The first attenuation device 50 alternates between full transmission mode (for time periods of length $\Delta T_{A2}$) and low transmission mode (for time periods of length $\Delta T_{A1}$). The resulting beam is then preferentially converted to a substantially continuous beam by the subsequent ion guide or gas collision cell 54, with a fraction $\Delta T_{A2}/\Delta T_{A1}$ of its original intensity. Similarly, the second attenuation device 52 operates with high transmission and low transmission time periods $\Delta T_{B2}$ and $\Delta T_{B1}$ respectively so that the average transmission through the second device 52 is $\Delta T_{B2}/\Delta T_{B1}$. Preferentially, the beam may be subsequently converted to a substantially continuous beam by a second ion guide or gas collision cell 56. The overall result of the above arrangement is that the ion beam is reduced to a fraction $(\Delta T_{A2}\ \Delta T_{B2})/(\Delta T_{A1}\ \Delta T_{B1})$ of its original intensity.

If each of the first and second attenuation devices 50,52 are independently capable of quantitatively reducing the ion beam to a fraction p of its original intensity, the combined device can quantitatively achieve a fraction $p^2$ of the original intensity. For example if the maximum quantitative attenuation for an individual device is 1%, then the combined device can achieve 0.01%.

Clearly the concept can be extended to include more than two devices separated by ion guides or gas collision cells designed to produce substantially continuous beams. For instance, when N devices, each individually capable of reducing the ion beam to a fraction p of its original intensity, are combined in this manner, a fraction $p^N$ of the original beam intensity may be achieved quantitatively. This power law behaviour means that extremely high attenuation factors can be achieved quantitatively using relatively few devices. This may be required, for example, to achieve the low ion arrival rates necessary to yield a high probability of populating a trap with a single ion.

In practice, it is not necessary for the attenuation devices or the associated gas cells to be arranged contiguously in an instrument. They may be separated by other devices such as reaction cells, mass filters, ion mobility devices etc. Each of these additional devices may serve several purposes or operate in several different modes, and may be configured to react, fragment or filter ions, or (possibly simultaneously) to convert a pulsed ion beam to a substantially continuous ion beam.

Additionally, one or other or both of the attenuation devices may be operated continuously in full transmission mode, with attenuation only activated as required.

Space Charge Tolerance of Trap

In embodiments, it may be desired for the CDMS device to be able to analyse multiple ions simultaneously to increase throughput. However, as mentioned above, with conventional CDMS devices, such as that described in Kiefer et al., space charge effects may significantly affect the performance when more than one ion is present in an ion trap.

Thus, in some embodiments, it is contemplated the CDMS device may comprise a plurality of ion traps. For example, the CDMS device may comprise a plurality of parallel ion traps, each having an associated one or more charge detection electrodes, arranged to receive a plurality of ions from an upstream device. In this example, multiple ions from the upstream device may be shared between the plurality of ion traps using appropriate ion optics (for example, ion lenses or beam splitting devices). Thus, the system may be arranged so that (single) ions are sequentially or selectively passed to one of a plurality of different ion traps.

Figure 6:
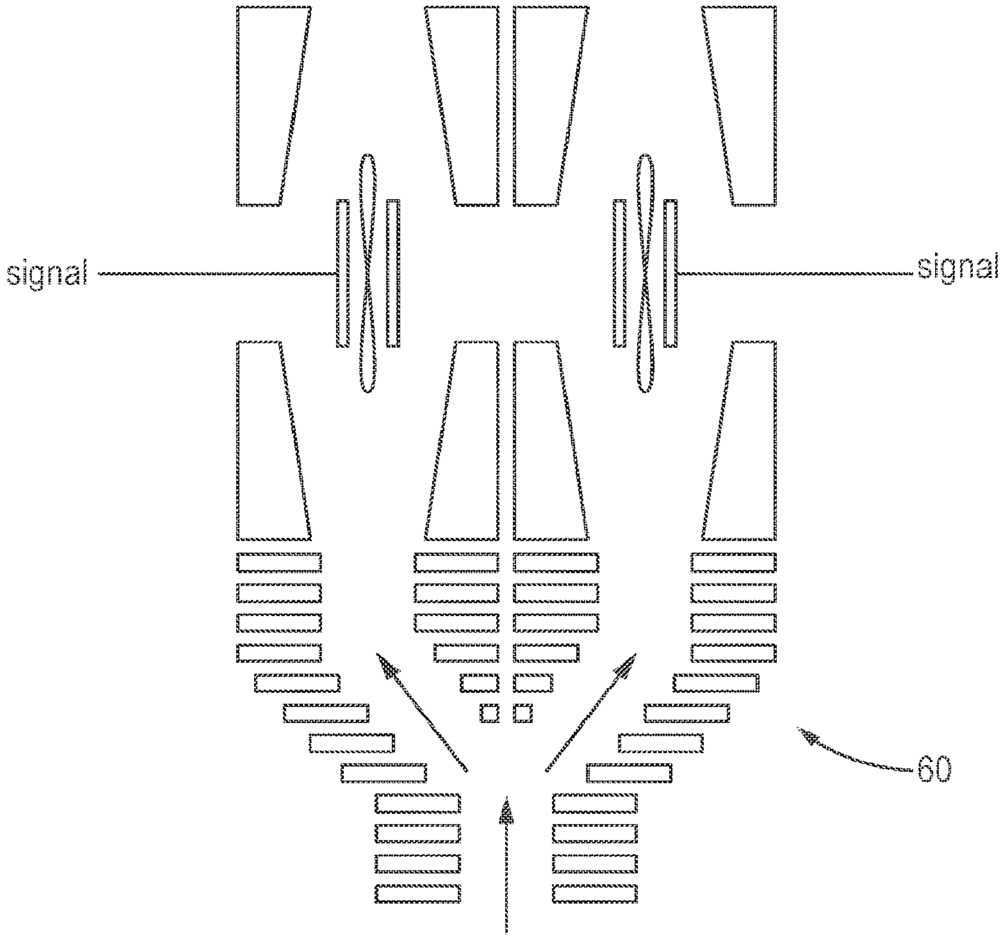
FIG. 6 shows the use of an ion optical device for selectively or sequentially passing respective ions to a plurality of CDMS devices.

FIG. 6 shows an example of such an arrangement wherein two CDMS devices of the general type shown in FIG. 1 are arranged in parallel and wherein an ion optical device 60 such as an ion lens, or other beam splitting device, is provided upstream of the CDMS devices for selectively or sequentially passing ions to the respective CDMS devices. In general, any suitable ion optical device may be used for directing the ions to the respective devices. For instance, US Patent Publication No. 2004/0026614 (MICROMASS) describes various techniques for ion beam manipulation. Of course, although FIG. 6 shows only two CDMS devices, this can be extended to any number of parallel CDMS devices, as desired. Furthermore, the CDMS devices need not be physically arranged in parallel, and can be arranged in any suitable fashion. For example, the devices could be arranged substantially opposite or orthogonal to one another.

As another example, the CDMS device may comprise a series of "leaky" ion traps, with each ion trap having a geometry that is configured such that trajectories become unstable when more than one ion is present. In this case, provided that the ions are suitably confined within the CDMS device, the ions will naturally distribute themselves along the series of traps as a result of space charge effects. The series of ion traps may therefore be contained within an ion guide such as a stacked ring ion guide.

Figure 7:
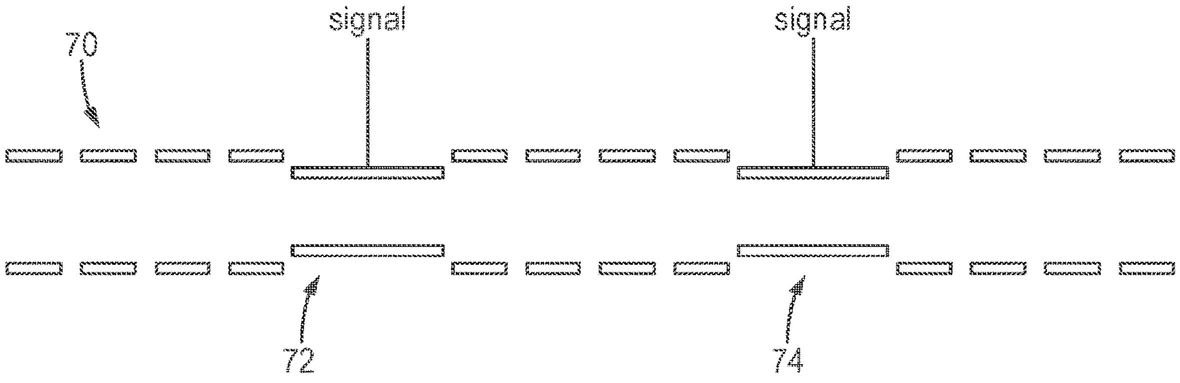
FIG. 7 shows an apparatus comprising a plurality of CDMS devices arranged within an ion guide.

FIG. 7 shows an example of such an arrangement wherein two CDMS devices 72, 74 of the general type shown in FIG. 1 are formed within a single ion guide 70 with the electrodes of the ion guide thus providing the ion traps and charge detectors for the CDMS devices. For instance, suitable RF and/or DC potentials can then be applied to the electrodes of the ion guide 70 in order to (radially) confine ions within the ion guide 70 and also to define one or more axial trapping regions along the length of the ion guide with the electrodes in the centre of the trapping region(s) then providing a charge detector for performing CDMS measurements. Ions can thus be injected into the ion guide 70 and allowed to naturally distribute between the ion trapping regions defining the CDMS devices 72,74. A CDMS measurement can then be performed in each CDMS device 72, 74 in parallel before ejecting the ions from each of the ion traps (and from the ion guide 70). Although FIG. 7 shows only two CDMS devices 72,74 it will be appreciated that any number of CDMS devices may be used in such an arrangement.

In these embodiments, each of the ion traps within the CDMS device may be arranged to analyse only a single ion. For example, N ion traps (wherein N>1) may be provided for analysing N ions.

However, embodiments are also contemplated wherein multiple ions (N>1) are analysed within a single ion trap. For example, if it can be arranged for trajectories to diverge (fan out) outside the region of the charge detector electrode, it may be possible to increase the capacity of the ion trap beyond a single ion (whilst still providing sufficient signal quality). For example, in three dimensions, the trajectories could occupy a "dumbbell" (or rotated "H") shape. In this case, ions would tend to be to be furthest apart when they are moving slowly, and therefore space charge effects would be reduced. Thus, in embodiments, multiple ions (N>1) may be analysed simultaneously, with the ion trajectories for the ions being arranged to diverge outside the region of the charge detector electrode.

Alternatively, or additionally, the ion trap may be extended to contain more than one charge detection electrode. For example, ions may be caused to take a folded flight path like trajectory within the ion trap, for example, wherein ions are caused to repeatedly pass back and forth between two reflecting electrodes in a multi-pass operation, for example, so as to travel along a substantially zigzagged, or "W"-shaped, path. Charge detection electrodes may then be periodically placed along the folded flight path (for example, in place of the periodic focusing elements that may be found within a folded flight path instrument). Each ion may thus pass through each of the multiple charge detection electrodes (so that multiple measurements can be made for each ion, thus potentially improving the signal quality). As another example, instead of using a folded flight path type geometry, a multi-detector configuration could be wrapped round in a circle to give a cyclic CDMS device with multiple charge detection electrodes. The signal from each charge detection electrode could be analysed separately or, if more convenient, some may be electronically coupled and the combined signal deconvolved in post-processing.

As yet another example, the device could be linear or circular with no orthogonal trapping and with many charge detection electrodes arranged along the flight path (for example, in a similar manner to ion velocity Fourier transform mass spectrometry techniques).

Figure 8:
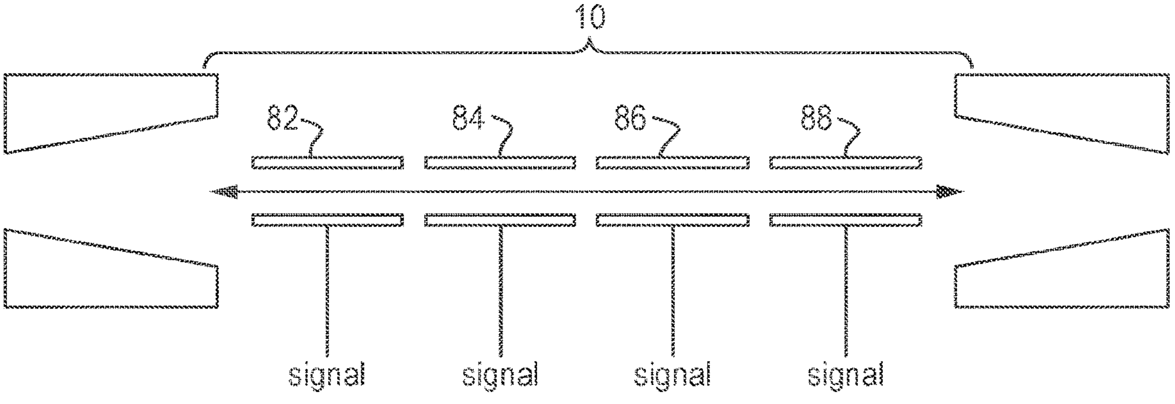
FIG. 8 shows an example of a CDMS device having multiple charge detectors within a single ion trap.

For instance, FIG. 8 shows an example of a CDMS device wherein multiple independent charge detecting electrodes are provided within a single cone trap 10. Although FIG. 8 shows four charge detectors 82,84,86,88 it will be appreciated that any number of charge detectors may be used, as desired. In embodiments, this device may be used for analysing single ions (with an increased resolution). However, provided that the ion trajectories are sufficiently separated, the device of FIG. 8 can also be used to perform simultaneous measurements on a plurality of ions. As shown, the charge detectors are decoupled from each other. This allows more information to be extracted. For instance, whilst the four (in this example) signals could be analysed separately and the results combined, in embodiments, the inference of the mass to charge ratio and charge values may be carried out simultaneously using the separate, uncombined signals. Various methods for analysing the data are possible. For example, the signals may be analysed using maximum likelihood (least squares), maximum a posteriori, Markov chain Monte-Carlo methods, nested sampling, and the like. Various other arrangements would of course be possible.

Improved Trajectories for Higher Resolution or Faster Operation

The Applicants have further recognised that the use of an approximately quadratic potential within the ion trap may result in improved energy tolerance of the device, for example, in that ions of the same mass-to-charge ratio but differing energy will produce signals having a more similar (or substantially the same) shape. More harmonic (sinusoidal) signals may give rise to cleaner spectra (with reduced harmonics). Thus, in embodiments, a substantially quadratic potential is used to confine the ions within the ion trap so that the ions undergo substantially harmonic motion within the ion trap (and through the charge detector electrode(s)). In this case the charge detector electrode may be located at the centre of the substantially quadratic potential. However, other arrangements would of course be possible.

Various existing geometries having suitably substantially quadratic potentials could be utilised. For example, it is contemplated that an Orbitrap type device or a SpiroTOF device (for example, as described in U.S. Pat. No. 9,721,779 (MICROMASS) or US Patent Application Publication No. 2017/0032951 (MICROMASS)) may be used. Devices with a central electrode (particularly the Orbitrap) have a relatively high space charge tolerance.

Figure 9A:
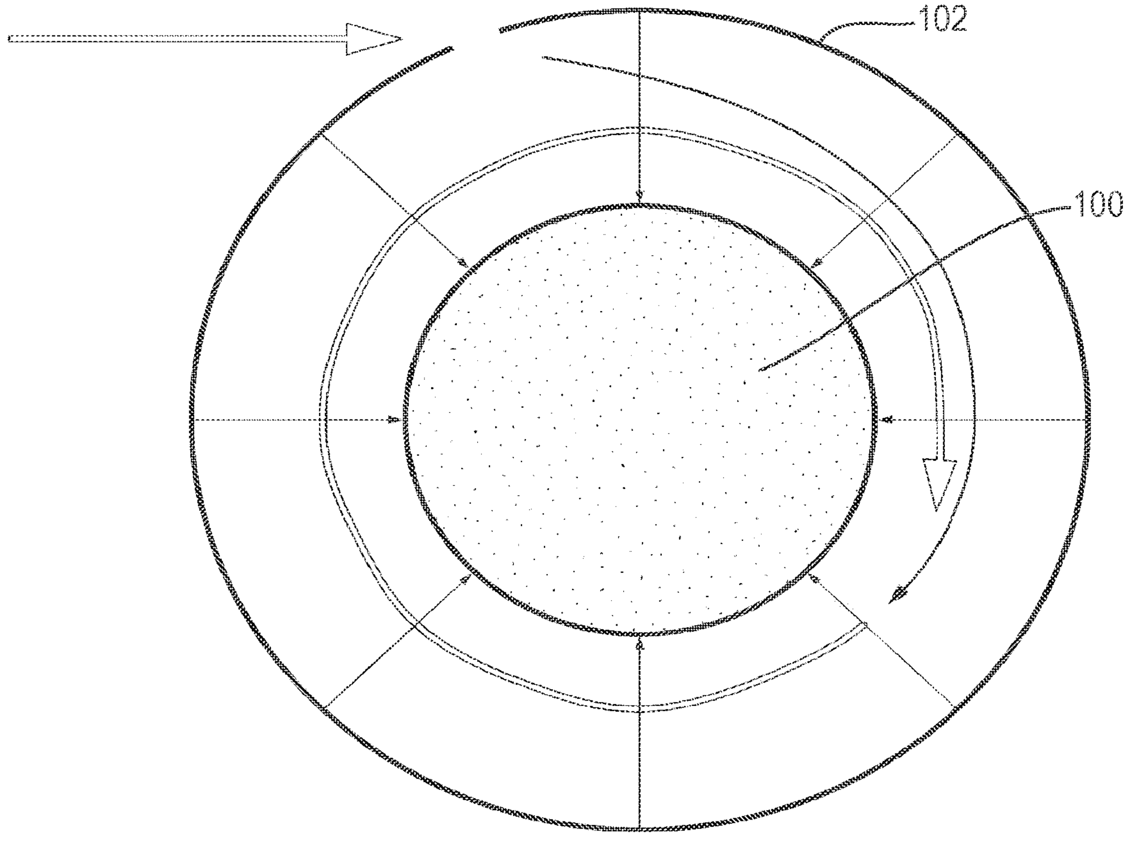
FIGS. 9A, 9B, 9C and 10 illustrate the operation of a SpiroTOF device that may be used according to embodiments as an ion trap for a CDMS device.

FIGS. 9A, 9B, 9C and 10 illustrate the operation of a SpiroTOF device that may be used according to embodiments as an ion trap for a CDMS device. As shown in FIG. 9A, ions are injected into an annular region defined between an inner cylinder 100 and an outer cylinder 102, each comprising an axial arrangement of electrodes. The ion beam may be expanded along the axis of the device during the injections (for example as described in U.S. Pat. No.

Figure 9B:
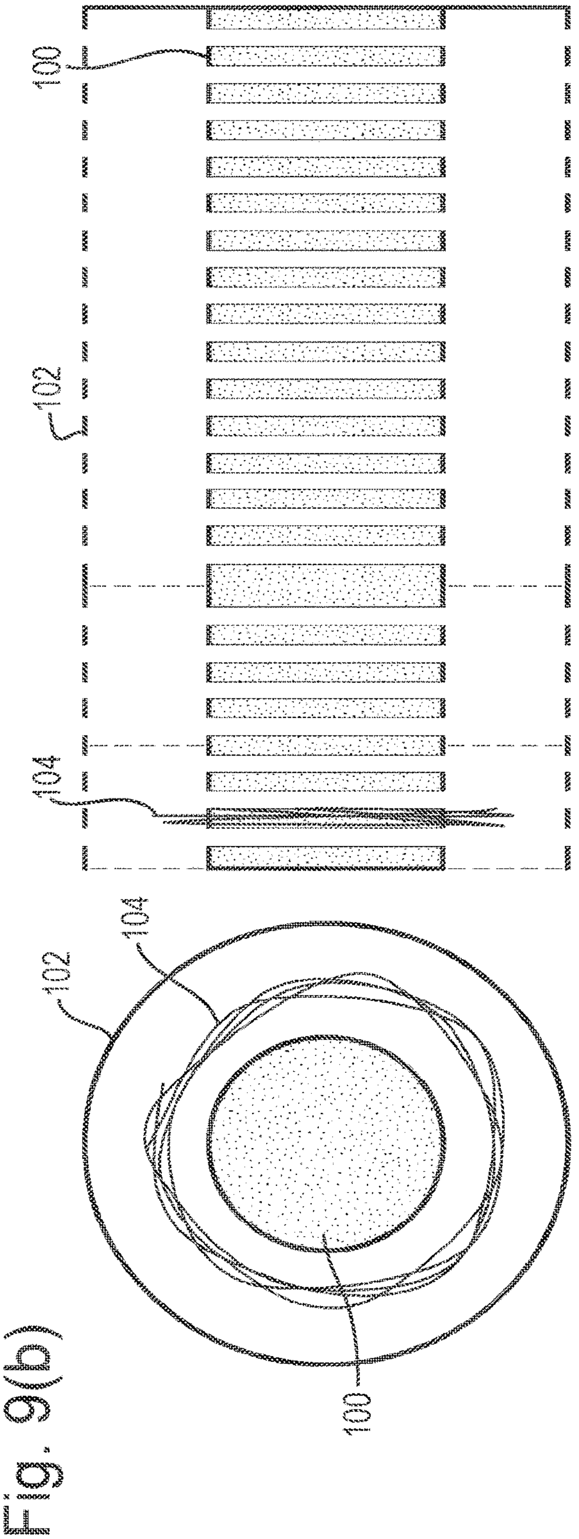
Figure 9C:
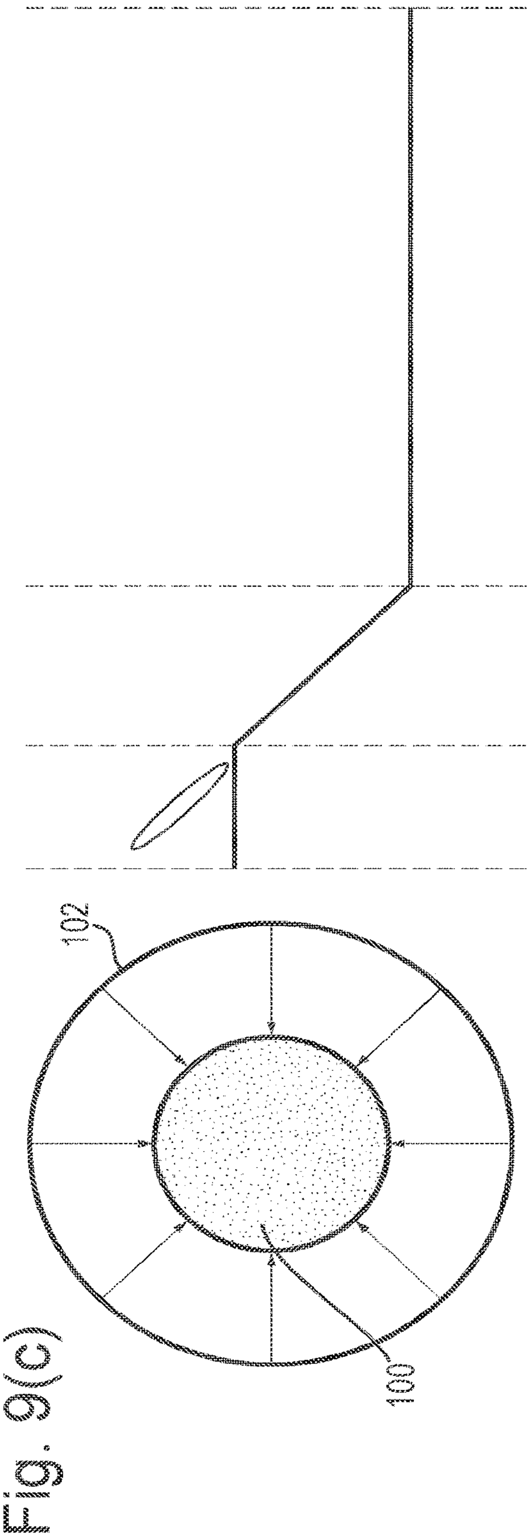

9,245,728 (MICROMASS)). The potentials that are applied between the inner and outer cylinders are selected to allow the ions to form stable circular orbits 104 within an entrance region of the device, as shown in FIG. 9B. Once the ions have been injected into a stable circular orbit, the ions can then be initially accelerated along the axis of the device, as shown in FIG. 9C.

Figure 10:
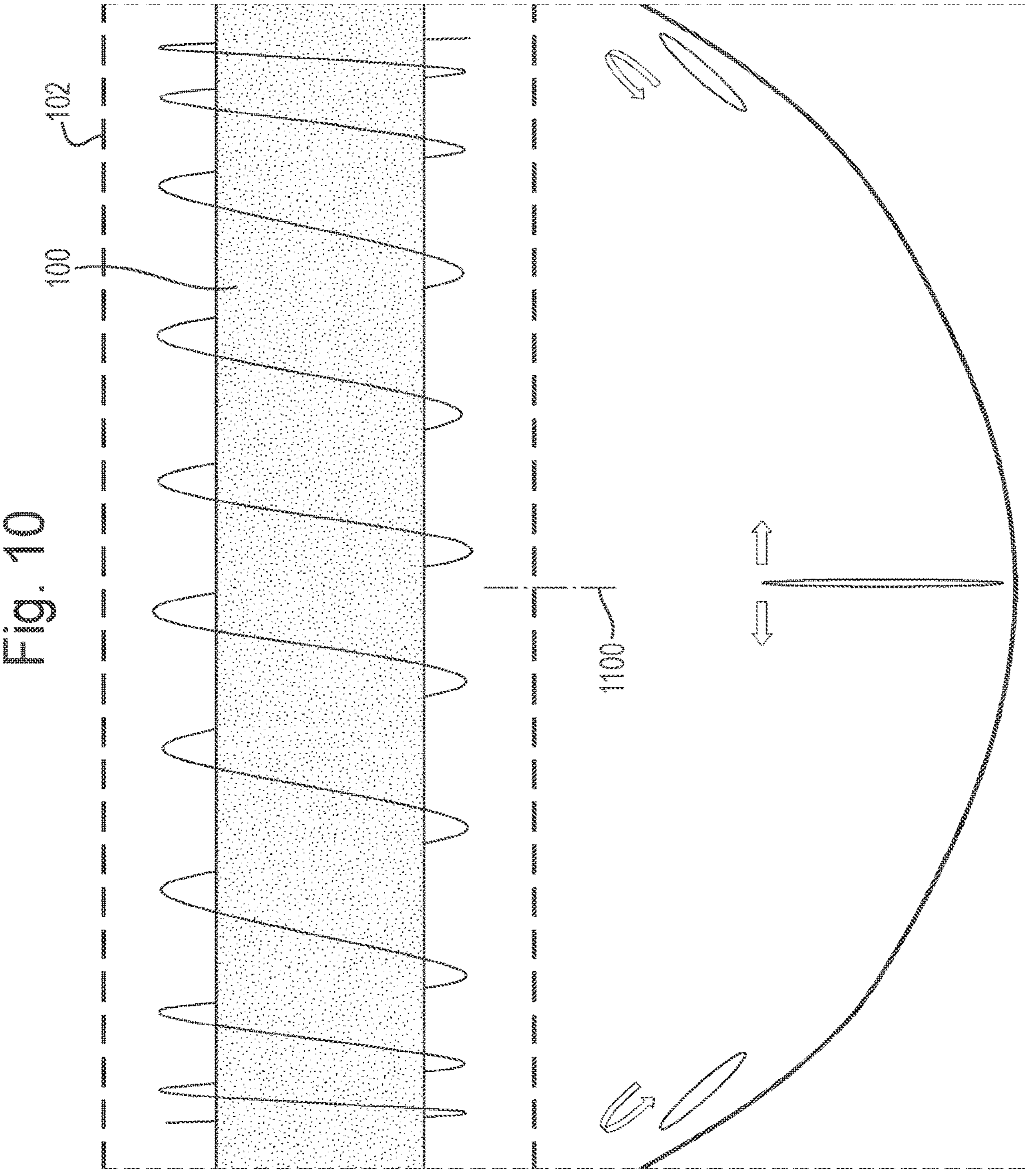

A substantially quadratic axial potential can then be set up along the device to cause the ions to begin to oscillate axially with substantially simple harmonic motion, as shown in FIG. 10. The conditions may be chosen so that the orbits remain circular (as shown in FIG. 10), or the ions may be allowed to oscillate radially (by imparting some radial excitation during the initial acceleration). A charge detector 1100 may then be positioned within the device, for example in the center thereof, so that the ions repeatedly pass close to the detector electrodes to generate a signal. The charge detector 1100 may comprise one or more of the segments chosen from the existing electrodes used to fix the substantially quadro-logarithmic potential in the device, or they may be additional electrodes with geometries and voltages designed to minimise perturbations to that potential.

This arrangement has the advantage that, even for a small number of ions, the average initial separation between the ions can be increased by beam expansion during the initial injection, reducing space charge effects. Furthermore, the inner electrodes 100 help to shield the ions from each other. Additionally, when ions of the same mass to charge ratio are moving slowly (at the extremes of their axial motion), and are therefore most susceptible to space charge effects, their average separation is largest owing to beam expansion.

However, other arrangements would of course be possible. For instance, an Orbitrap-type geometry using a substantially quadro-logarithmic potential may also provide similar advantages. This may also be the case, for instance, for Cassinian orbits such as those described in U.S. Pat. No. 8,735,812 (BRUKER DALTONIK GMBH), depending on the trajectory chosen.

Signal Processing

The use of Fourier Transform processing on anharmonic signals is well known to produce artefact "harmonics". However, in embodiments, forward fitting/Bayesian signal processing using model peak shape, or shapes, may be used. This may significantly reduce the intensity of harmonics and improve signal-to-noise in the inferred spectrum. Thus, this may in turn provide a higher mass resolution in a fixed time (or similarly the same resolution to be achieved in a shorter time). For instance, the Applicants have recognised similar techniques such as those described in US Patent Application Publication No. 2016/0282305 (MICROMASS) for processing ion mobility data may also advantageously be used for processing the CDMS signals obtained according to various embodiments described herein. For example, by using similar such techniques, it may be possible in embodiments to extract a charge value from the fitted amplitude. Especially if space charge limitations are reduced, such signal processing approaches may thus be capable of extracting high quality spectra from trapping events including more than one ion.

Although the present invention has been described with reference to preferred embodiments, it will be understood by those skilled in the art that various changes in form and detail may be made without departing from the scope of the invention as set forth in the accompanying claims.

The invention claimed is:

1. An ion beam attenuating apparatus comprising:

a first ion beam attenuator that is operable in either a high ion transmission mode or a low ion transmission mode in order to selectively attenuate an ion beam, wherein the output of the first ion beam attenuator is passed through a first gas-filled region;

a second ion beam attenuator that is operable in either a high ion transmission mode or a low ion transmission mode in order to selectively attenuate an ion beam; and control circuitry that is configured to:

repeatedly switch the first ion beam attenuator between the high and low ion transmission modes to generate a first non-continuous ion beam at the output of the first ion beam attenuator, wherein the first non-continuous ion beam is passed through the gas-filled region and converted into a substantially continuous ion beam thereby before arriving at the second ion beam attenuator; and repeatedly switch the second ion beam attenuator between the high and low ion transmission modes to generate a second non-continuous ion beam at the output of the second ion beam attenuator.

2. The apparatus of claim 1, wherein the output of the second ion beam attenuator is passed through a second gas-filled region to generate a substantially continuous attenuated ion beam.

3. The apparatus of claim 2, wherein the apparatus is arranged for the substantially continuous attenuated ion beam to be provided from the second gas-filled region to:

an ion trap; or an ion detector; or a reaction cell; or a third ion beam attenuator.

4. The apparatus of claim 2, comprising an ion trap configured for trapping a single ion therein, wherein the apparatus is arranged to provide the substantially continuous attenuated ion beam from the second gas-filled region to the ion trap.

5. The apparatus of claim 1, wherein the control circuitry is configured to adjust the relative attenuation provided by the first ion beam attenuator and the second ion beam attenuator to achieve a target overall attenuation.

6. The apparatus of claim 1, wherein the control circuitry is configured to control the attenuation provided by the first and/or second ion beam attenuators by controlling the frequency of switching between the high and low ion transmission modes.

7. The apparatus of claim 1, wherein the control circuitry is configured to:

repeatedly switch the first ion beam attenuator between the high and low ion transmission modes at a first frequency; and repeatedly switch the second ion beam attenuator between the high and low ion transmission modes at a second frequency that is different to the first frequency.

8. The apparatus of claim 1, wherein the first and/or second ion beam attenuator comprises one or more electrostatic lenses.

9. The apparatus of claim 8, wherein the electrostatic lenses comprise one or more electrodes, and wherein the control circuitry is configured to switch between the high and low ion transmission modes by changing one or more voltages applied to the electrodes.

10. The apparatus of claim 1, wherein the first and/or second ion beam attenuator is configured to transmit substantially 100% of ions when in the high ion transmission mode.

11. The apparatus of claim 1, wherein the first and/or second ion beam attenuator is configured to transmit substantially 0% of ions when in the low ion transmission mode.

12. The apparatus of claim 1, wherein the first gas-filled region comprises an ion guide or a gas collision cell.

13. The apparatus of claim 1, wherein the apparatus comprises a differential pumping aperture provided at the entrance and/or exit of the first gas-filled region.

14. A method of attenuating an ion beam, comprising:

passing the ion beam to a first ion beam attenuator and repeatedly switching the first ion beam attenuator between high and low ion transmission modes to generate a first non-continuous ion beam at the output of the first ion beam attenuator;

passing the first non-continuous ion beam through a gas-filled region to convert the first attenuated ion beam into a substantially continuous attenuated ion beam; and passing the substantially continuous ion beam to a second ion beam attenuator and repeatedly switching the second ion beam attenuator between high and low ion transmission modes to generate a second non-continuous ion beam at the output of the second ion beam attenuator.

15. The method of claim 14, further comprising passing the second attenuated ion beam through a second gas-filled region to generate a substantially continuous attenuated ion beam.

16. The method of claim 15, comprising providing the substantially continuous attenuated ion beam from the second gas-filled region to:

an ion trap; or an ion detector; or a reaction cell; or a third ion beam attenuator.

17. The method of claim 14, wherein the first and/or second ion beam attenuator comprises one or more electrostatic lenses.

18. The method of claim 14, comprising controlling the attenuation provided by the first and/or second ion beam attenuators by controlling the frequency of switching between the high and low ion transmission modes.

19. The method of claim 14, comprising controlling the gas pressure within the first gas-filled region when converting the first attenuated ion beam into the substantially continuous ion beam.

20. The method of claim 14, comprising:

the first and/or second ion beam attenuator transmitting substantially 100% of ions when in the high ion transmission mode; and/or the first and/or second ion beam attenuator transmitting substantially 0% of ions when in the low ion transmission mode.

* * * * *